(12) United States Patent
Tachikawa

(10) Patent No.: US 8,704,957 B2
(45) Date of Patent: Apr. 22, 2014

(54) UNIT FOR RETURNING ERRONEOUS OPERATION THAT INSTRUCTS DISPLAY DEVICE TO DISPLAY OPERATION HISTORY WHEN PANIC KEY IS PRESSED

(75) Inventor: Hitoshi Tachikawa, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1187 days.

(21) Appl. No.: 11/800,706

(22) Filed: May 7, 2007

(65) Prior Publication Data

US 2007/0258011 A1    Nov. 8, 2007

(30) Foreign Application Priority Data

May 8, 2006    (JP) .................................. 2006-129528

(51) Int. Cl.
  *H04N 5/44* (2011.01)
(52) U.S. Cl.
  USPC ........... 348/734; 348/569; 348/563; 348/553; 348/725; 340/12.22
(58) Field of Classification Search
  USPC .................................. 348/569, 563, 553, 734
  See application file for complete search history.

(56) References Cited

U.S. PATENT DOCUMENTS

| | | | |
|---|---|---|---|
| 4,862,498 A | 8/1989 | Reed | |
| 6,037,877 A | 3/2000 | Matthews | |
| 6,111,575 A | 8/2000 | Martinez et al. | |
| 7,822,319 B2 * | 10/2010 | Miyazaki | 386/291 |
| 2002/0113896 A1 * | 8/2002 | Takagi et al. | 348/569 |
| 2005/0172228 A1 * | 8/2005 | Kakuda | 715/530 |
| 2006/0059520 A1 * | 3/2006 | Miyazawa | 725/52 |
| 2007/0169157 A1 * | 7/2007 | Abernethy et al. | 725/89 |

FOREIGN PATENT DOCUMENTS

| | | |
|---|---|---|
| EP | 0886414 | 12/1998 |
| JP | H04-207694 A | 7/1992 |
| JP | 05-292420 | 11/1993 |
| JP | H07-284034 A | 10/1995 |
| JP | 2000-230833 A | 8/2000 |
| JP | 2003-069917 | 3/2003 |
| JP | 2003-333358 | 11/2003 |
| JP | 2004-297285 A | 10/2004 |
| WO | WO2006/038161 | 4/2006 |
| WO | WO 2006038161 A1 * | 4/2006 |

OTHER PUBLICATIONS

The extended European search report, pursuant to Rule 44a EPC dated Sep. 11, 2007, searched on Aug. 31, 2007.
Min Zhang, et al. "Implementing Undo/Redo in PDF Studio Using Object-Oriented Design Pattern", Oct. 30, 2000.
Japanese Notice of the reason for refusal, dated Apr. 16, 2008.

* cited by examiner

*Primary Examiner* — Jefferey Harold
*Assistant Examiner* — Omer Khalid
(74) *Attorney, Agent, or Firm* — Yokoi & Co., U.S.A., Inc.; Toshiyuki Yokoi

(57) ABSTRACT

The present invention discloses an apparatus a television apparatus capable of showing, on a screen, a menu screen and an input switching screen instead of an image display screen, while being capable of changing setting data through a remote controller operation, comprising: an operation history recording unit configured to record operation instructions to the television apparatus as the items of an operation history; and a unit for returning from erroneous operation configured to be started up by the panic key mounted on the remote controller and perform a return movement from erroneous operations so as to return the setting of the television apparatus to the state corresponding to the item of the operation history recorded before the panic key operation by the operation history recording unit.

4 Claims, 8 Drawing Sheets

| Operation Time | Operation Name | Number of Operations |
|---|---|---|
| 10:50,11 | Channel 1 Selection | 10 |
| 10:40 | Video 3 Selection | 50 |
| 10:31,30 | Video 5 Selection | 10 |
| 10:31,32 | Mute Key | 5 |
| 10:31,50 | | |

FIG. 2

| Operation Time | Operation Name | Number of Operations |
| --- | --- | --- |
| 10:35,11 | Channel 1 Selection | 10 |
| 10:32,20 | Menu Screen Display | 3 |
| 10:31,30 | Input Switching | 5 |
| 10:30,32 | Video 5 Selection | 20 |
| 10:00,50 | Mute Key | 2 |
| | Channel 3 Selection | 1 |

FIG. 5

| Operation Time | Operation Name | Number of Operations |
|---|---|---|
| 10:50,11 | Channel 1 Selection | 10 |
| 10:40 | Video 3 Selection | 50 |
| 10:31,30 | Video 5 Selection | 10 |
| 10:31,32 | Mute Key | 5 |
| 10:31,50 | | |

| | Channel Selection | Input Selection | Menu Screen | Image Quality Adjustment 1 | |
|---|---|---|---|---|---|
| Channel | aa1 | aa2 | aa3 | aa4 | ------- |
| Input | bb1 | bb2 | bb3 | bb4 | ------- |
| Menu Screen | cc1 | cc2 | cc3 | cc4 | ------- |
| Image Quality Adjustment 1 | dd1 | dd2 | dd3 | dd4 | ------- |
| Image Quality Adjustment 2 | ee1 | ee2 | ee3 | ee4 | ------- |
| Mute Key | ff | ------- | ------- | ------- | ------- |
| ------- | gg | ------- | ------- | ------- | ------- |
| ------- | hh | ------- | ------- | ------- | ------- |
| ------- | ------- | ------- | ------- | ------- | ------- |
| ------- | ------- | ------- | ------- | ------- | ------- |

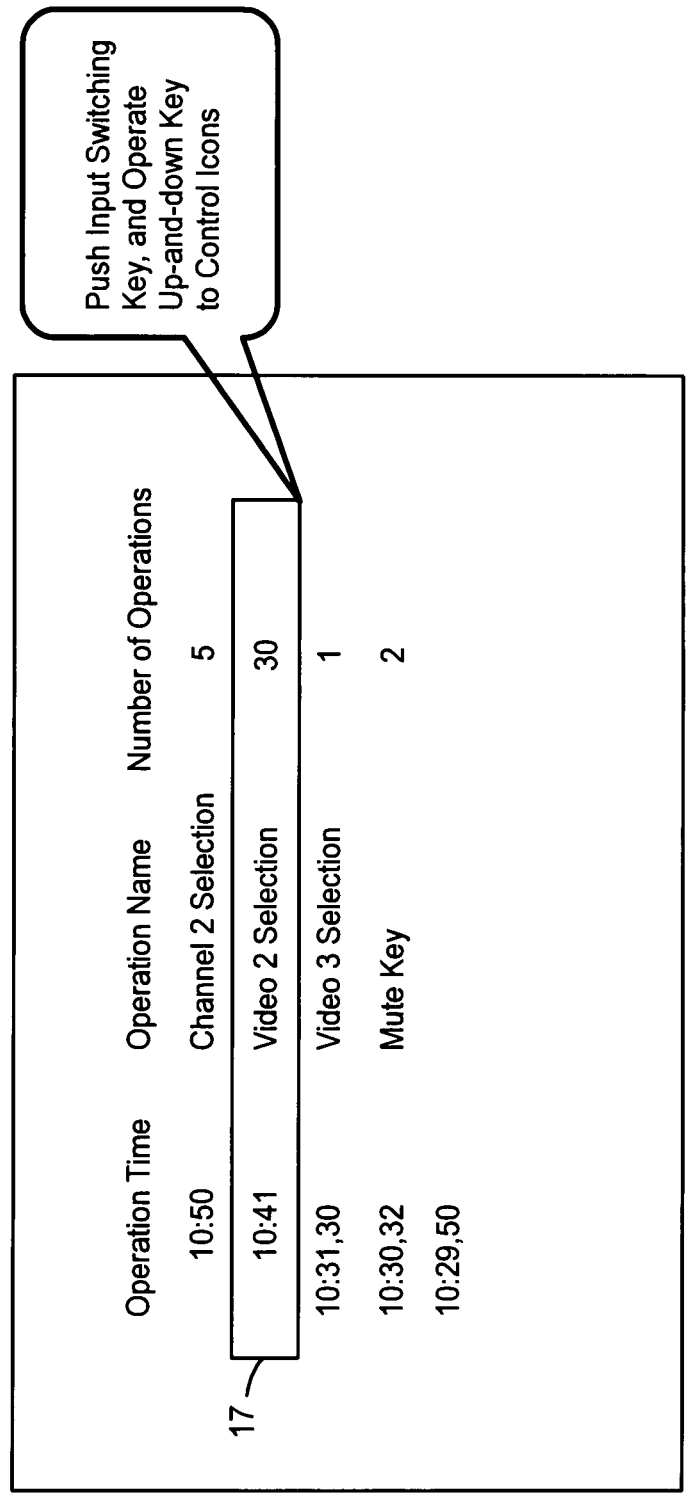

UNIT FOR RETURNING ERRONEOUS OPERATION THAT INSTRUCTS DISPLAY DEVICE TO DISPLAY OPERATION HISTORY WHEN PANIC KEY IS PRESSED

CROSS-REFERENCES TO RELATED APPLICATIONS

The present application is related to the Japanese Patent Application No. 2006-129528, filed May 8, 2006, the entire disclosure of which is expressly incorporated by reference herein.

BACKGROUND OF THE INVENTION (1) Field of the Invention

The present invention relates to television apparatuses and, in particularly, to a television apparatus that is capable of changing setting data through a menu screen and the like.

(2) Description of the Related Art

Conventional television apparatuses have setting data for channel switching, sound volume control, switching of inputs from external apparatuses such as video equipment, and image quality adjustment. The setting data can be changed through menu screens displayed with the use of OSD images as well as through remote controllers. When setting data is changed, broadcast programs are not displayed on the TV screen. Especially on menu screens or on screens where input switching is performed, nothing is displayed or only OSD images are displayed, which is very different from ordinary broadcast programs.

However, today television apparatuses have become widely used all over the world, and they are now used by many users with various backgrounds. There are some users who use television apparatuses without any knowledge about the setting data. There is a possibility such users will change setting data on screen by erroneous operations. In such cases, those users often make the wrong judgment that the television apparatuses have broken down because the users do not acknowledge that they have changed the setting data. Even if the users acknowledge that they have changed the setting data, they can not return the screens to their previous states if the users are not familiar with how to operate the menu screens, with the result that the users feel disturbed with such situations.

As one of the ways to return the television apparatus easily and quickly to the state of channel selection, a remote controller that includes a recording unit for recording channel selection history data and a history displaying unit for displaying the channel selection history data recorded by the recording unit is disclosed. In addition, the remote controller provides a function to enable a user to select his desired channel without knowledge about how to return the television apparatus to the state of channel selection (refer to Japanese Unexamined Patent Application Publication (JP-A-2003-333358).

And also disclosed is another television apparatus that includes a remote controller equipped with a release key. A user can easily return the setting data of the television apparatus to the previous state using the release key when he is at a loss as to how to operate the television apparatus in setting mode, with the result that the user can operate the television apparatus without anxiety even if he is unfamiliar with the operation (refer to JP-A-5-292420).

In addition, disclosed is another television apparatus that includes a recording unit for recording setting data, a selecting function for selecting setting data recorded by the recording unit, and a setting function for setting an initial setting according to the setting data selected by the selecting unit. Every time the television apparatus is powered on, it is returned to the setting state equal to the state just before the television apparatus was powered off the last time (refer to JP-A-2003-69917).

BRIEF SUMMARY OF THE INVENTION

In the television apparatus described in the JP-A-2003-333358, there is a problem in that although it is easily and quickly performed to select a user's desired channel with the use of the history displaying unit, it is impossible to return setting data to their previous values.

In the television apparatuses described in the JP-A-5-292420, there are problems as follows:
(1) Although it is possible to return the setting data of the television apparatus to the previous state using the release key, a user cannot select the state to which the television apparatus is returned under any state of the television apparatus when erroneous operations are performed.
(2) In addition, a user cannot understand the current state of the television apparatus, he cannot use the operation menu without referring to the instruction manual.

In addition, in the television apparatus described in the JP-A-2003-69917, there are problems as follows:
(1) The television apparatus must be powered off in order to return the setting data to the previous values.
(2) It is difficult to return the setting data to the previous values when erroneous setting is made to the setting data.

In view of the above-described problems the present invention is achieved. The present invention is to provide a television apparatus that has a function that the television apparatus can be returned to one of the previous states by the simple operation of a remote controller when a user performs an erroneous operation to set the state of the television apparatus and the state to which the television apparatus is returned can be selected by the user.

To address the problems, plural aspects of the present invention are described below.

A first aspect of the present invention is directed to a television apparatus, including:

a plurality of input terminals configured to receive video and audio signals from external apparatuses;

an OSD circuit configured to display a menu screen where various operation settings are made;

an image/sound output unit configured to receive television broadcasts and display the images and sounds of the desired channel, while being capable of changing the image quality and the sound volume; and a microcomputer configured to instruct the input terminals to be switched, instruct the OSD circuit to display the menu screens, and instruct the image/audio output unit to adjust the image quality and the sound volume through the operation of a remote controller.

The microcomputer instructs a recording-unit to record any operation of channel switching operation, input terminal switching operation, operations corresponding to the displayed items of the menu screens, image quality adjustment operation, and sound volume adjustment operation in an operation history table as an operation history item that is input to the microcomputer.

The recording unit stores a program for returning from erroneous operation for returning the television apparatus to a state before an erroneous operation from a state to which the television apparatus is set by an erroneous operation through the operation of a panic key mounted on the remote controller.

The program is configured to be booted up and serve to control the return movement from erroneous operation by the remote controller operation wherein (i) when the panic key operation is operated, the microcomputer instructs the operation history table to be displayed on screen, (ii) when one of the items of the operation history table on screen is selected through the remote controller operation, the microcomputer instructs the return movement to be performed from erroneous operation corresponding to the selected item.

If the number of times when the item is selected is larger than a specified threshold value, an instruction screen to show the operation steps to return the setting of the television apparatus to the state corresponding to the selected item of the operation history is displayed on screen.

According to the first aspect, the microcomputer instructs a recording unit to record any operation of channel switching operation, input terminal switching operation, operations corresponding to the displayed items of the menu screens, image quality adjustment operation, and sound volume adjustment operation in an operation history table as an operation history item that is input to the microcomputer; the recording unit stores a program for returning from erroneous operation for returning the television apparatus to a state before an erroneous operation from a state to which the television apparatus is set by an erroneous operation through the operation of a panic key mounted on the remote controller; the program is configured to be booted up and serve to control the return movement from erroneous operation by the remote controller operation wherein (i) when the panic key operation is operated, the microcomputer instructs the operation history table to be displayed on screen, (ii) when one of the items of the operation history table on screen is selected through the remote controller operation, the microcomputer instructs the return movement to be performed from erroneous operation corresponding to the selected item; and if the number of times when the item is selected is larger than a specified threshold value, an instruction screen to show the operation steps to return the setting of the television apparatus to the state corresponding to the selected item of the operation history is displayed on screen.

A second aspect of the present invention is directed to a television apparatus capable of showing, on a screen, a menu screen and an input switching screen instead of an image display screen, while being capable of changing setting data through a remote controller operation, including:

an operation history recording unit configured to record operation instructions to the television apparatus as the items of an operation history; and a unit for returning from erroneous operation configured to be started up by the panic key mounted on the remote controller and perform a return movement from erroneous operations so as to return the setting of the television apparatus to the state corresponding to the item of the operation history recorded before the panic key operation by the operation history recording unit.

In the second aspect of the present invention, because a unit for returning from erroneous operation is started up by the panic key mounted on the remote controller and performs a return movement from erroneous operations so as to return the setting of the television apparatus to the state corresponding to the item of the operation history recorded before the panic key operation by the operation history recording unit, the return movement from erroneous operations can be easily performed, and at the same time the state to which the television apparatus returns can be selected.

A third aspect of the present invention is directed to the television apparatus according to the second aspect, wherein, through the panic key operation, the unit for returning from erroneous operation: switches the input to the last channel or to another external input when an external input without images is displayed; switches the input to the last channel or to another external input when a channel without broadcast signals is displayed; erases a menu screen when the menu screen is displayed; returns an image quality adjustment to an initial setting when the display changes due to the image quality adjustment; and returns a sound volume to a default value when there is no sound.

In the third aspect of the present invention, because the resetting of the television apparatus is performed under the predetermined conditions, the return movement from erroneous operations can be performed by simple operations.

A fourth aspect of the present invention is directed to the television apparatus according to either the second aspect or the third aspect, wherein the unit for returning from erroneous operation displays on screen the operation history recorded by the operation history recording unit through the panic key operation.

In the fourth aspect of the present invention, because the unit for returning from erroneous operation displays on screen the operation history recorded by the operation history recording unit through the panic key operation, the user can confirm what was wrong with his operation, which helps improve his operation skill.

A fifth aspect of the present invention is directed to the television apparatus according to the fourth aspect, wherein, when the item of the operation history is selected through the remote controller operation, the unit for returning from erroneous operation returns the setting to the state of an item of the operation history displayed on screen.

In the fifth aspect of the present invention as mentioned above, because the user can select an item of the operation history displayed on screen by using the remote controller, and the unit for returning from erroneous operation performs the return movement corresponding to the selected item, the return movement can be performed as desired by the user.

A sixth aspect of the present invention is directed to the television apparatus according to either the fourth aspect or the fifth aspect, wherein: the operation history recording unit records the number of times each item of the operation history is selected; the operation history recording unit displays on screen an operation instruction screen in accordance with the selected item of the operation history and based on the number of times the item is selected.

In the sixth aspect of the present invention, because the operation history recording unit displays on screen an operation instruction screen in accordance with the selected item of the operation history and based on the number of times the item is selected, he/her could benefit reduction of the number of erroneous operations.

A seventh aspect of the present invention is directed to the television apparatus according to the fifth aspect, wherein the unit for returning from erroneous operation sequentially performs the operations of items of the operation history recorded in the operation history recording unit.

In the seventh aspect, because the unit for returning from erroneous operation sequentially performs the operations of items of the operation history recorded in the operation history recording unit, the desired setting of the television apparatus can be quickly achieved.

As described above, the present invention provides a television apparatus that can be returned to a certain state from the state to which the television apparatus is set by an erroneous operation, and at the same time can be returned to the state desired by a user through a simple operation.

According to the third aspect of the present invention, because the resetting of the television apparatus is performed under the predetermined conditions, the return movement from erroneous operations can be performed by simple operations.

According to the fourth aspect of the present invention, because the operation data that has been performed is recorded, the user can confirm what was wrong with his operation, which helps improve his operation skill.

According to the fifth aspect of the present invention, because the user can select an item of the operation history and the return movement starts from the movement corresponding to the selected item, the return movement can be performed as desired by the user.

According to the sixth aspect of the present invention, because the operation history recording unit records the user's erroneous operations and lets the user know his erroneous operations, he can reduce the number of erroneous operations.

According to the seventh aspect of the present invention, because the erroneous operations are canceled one by one, the desired setting of the television apparatus can be quickly achieved.

It goes without saying that the first aspect of the present invention configured in more concrete form as mentioned above has advantageous effects similar to the second to seventh aspects of the present invention.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention.

Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout:

FIG. 1 is a block diagram exemplary showing the block configuration of the television apparatus 10.

FIG. 2 exemplary shows the operation history table.

Figure 3:
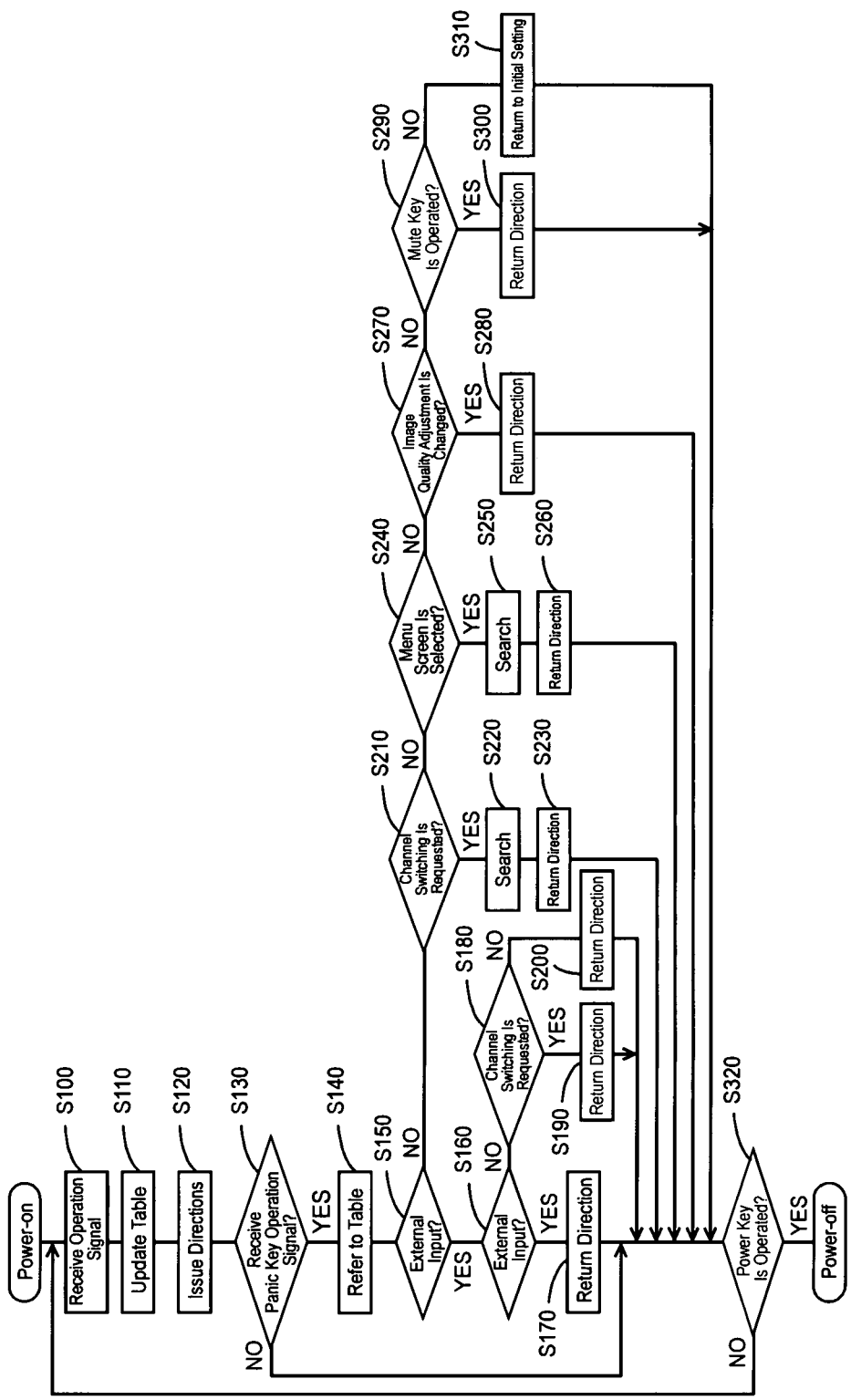

FIG. 3 exemplary shows the operational flowchart of the microcomputer 13g in the return setting method 1.

Figure 4:
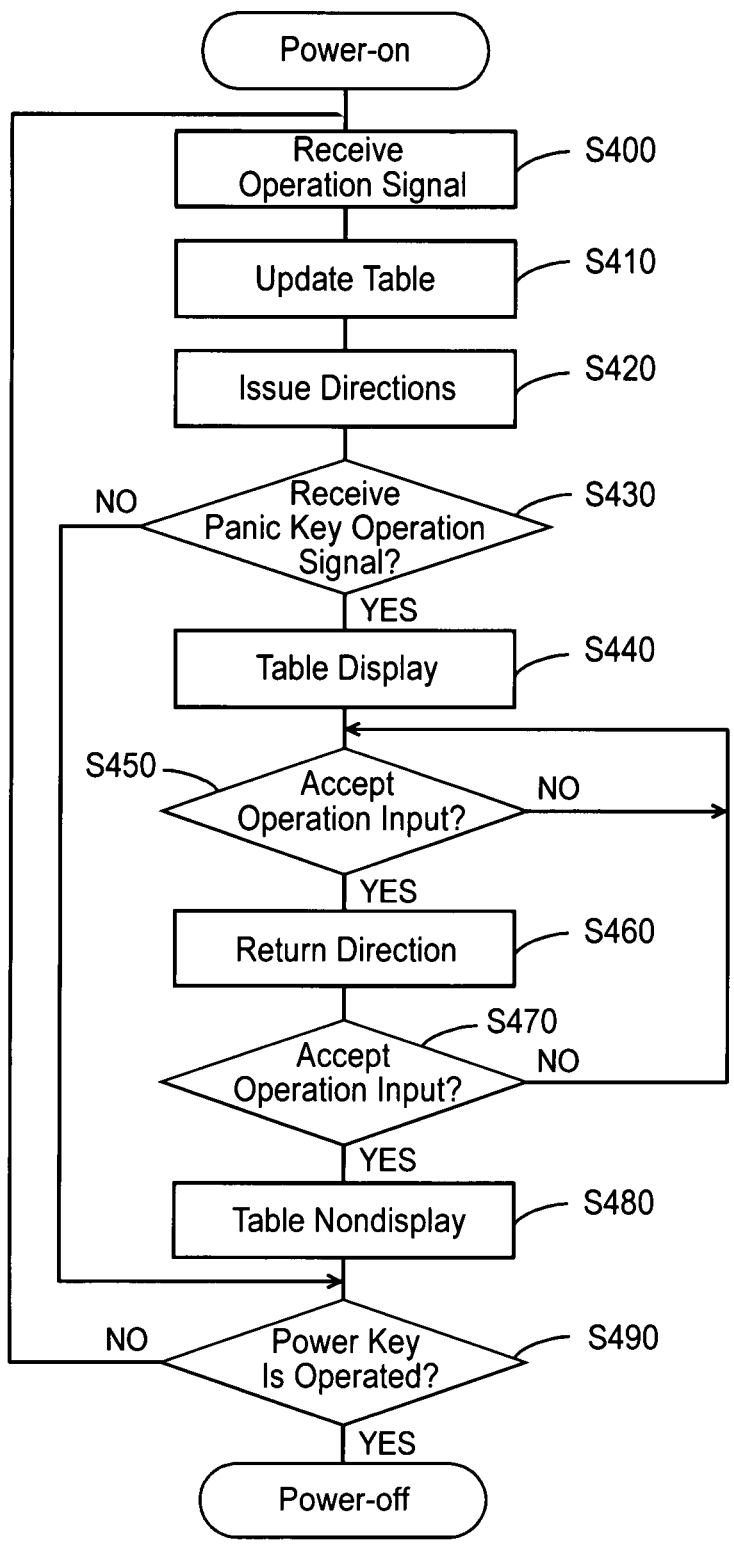

FIG. 4 exemplary shows the operational flowchart of the microcomputer 13g in the return setting method 2.

FIG. 5 exemplary shows the operation history table displayed on screen.

FIG. 6 exemplary shows the selection table of the explanation screen.

Figure 7:
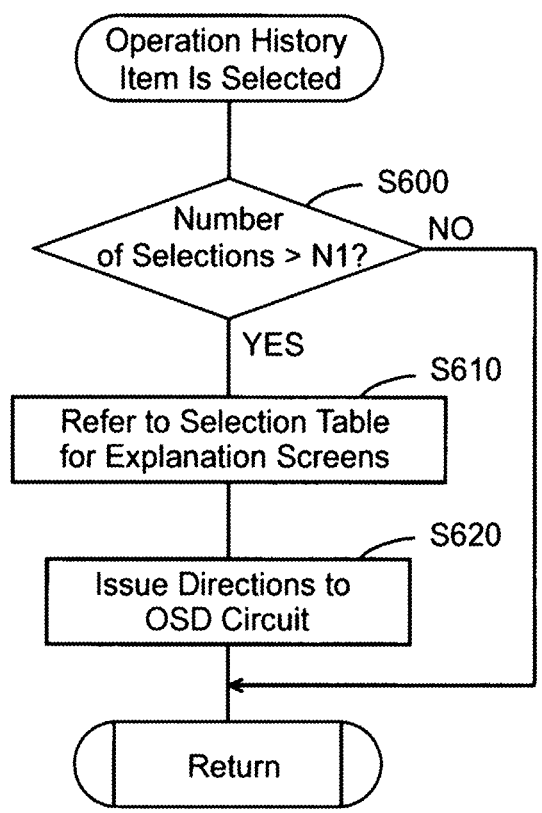

FIG. 7 exemplary shows the operational flowchart of the microcomputer 13g to display the explanation screen.

FIG. 8 exemplary shows the operation history table with the explanation screen.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Television apparatuses related to the preferred embodiments of the present invention will be described in detail hereafter in the following order.

A. configuration of a television apparatus
B. A first embodiment of the present invention
C. A second embodiment of the present invention
D. A variation example 1 of the present invention
E. A variation example 2 of the present invention
F. Conclusion

A. A Configuration of a Television Apparatus

Figure 1:
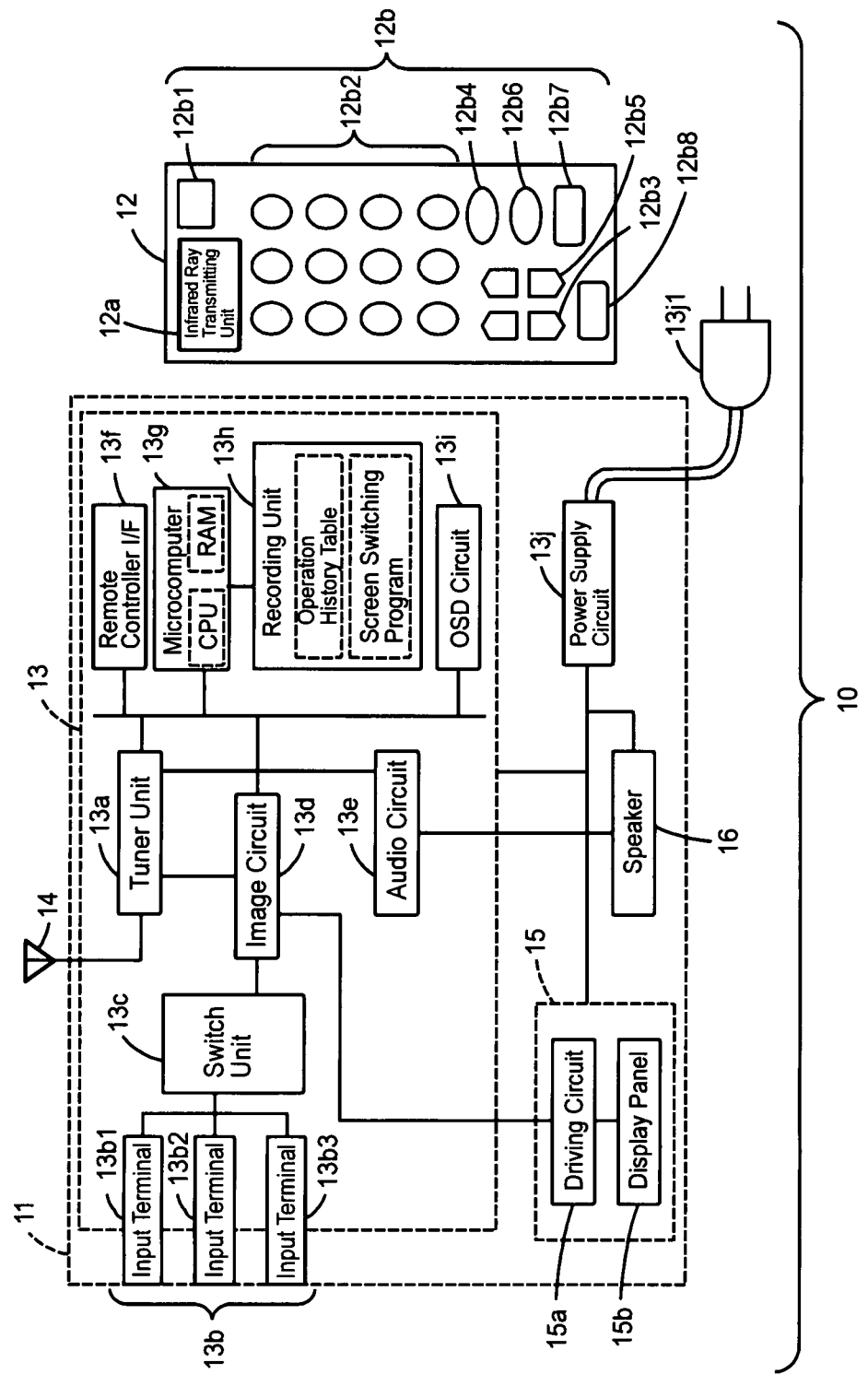

A television apparatus 10 related to a first embodiment of the present invention will be described below with reference to FIG. 1 to FIG. 8. FIG. 1 is a block diagram of the television apparatus 10. As shown in FIG. 1, the television apparatus 10 includes an image display unit 11 and a remote controller 12. The image display unit 11 selects a given channel signals among television broadcast waves that are received by an antenna 14, and displays the images of the channel signals on a display device 15, and at the same time displays the images using the signals input through an input terminal group 13b on the display device 15. The remote controller 12 is used to remote-control the image display unit. The configuration and function of each component will be described in detail below.

The remote controller 12 includes an operation key group 12b that outputs corresponding operation signals when one of the keys is pushed, and an infrared ray transmitting unit 12a that receives the operation signals, converts the operation signals to corresponding infrared signals, and radiates the infrared signals. The operation key group 12b includes a power key 12b1 that is used to power on or off the image display unit 11, channel keys 12b2 that is used to select a channel, a pair of sound volume keys 12b3 that is used to turn up or decrease sound volume, a menu key 12b4 that is used to display a menu screen on a screen, a pair of up-down keys 12b5 that is used to move a cursor up or down on the menu screen, a decision key 12b6 that is used to decide that the operation corresponding to each item of the menu screen is performed, and a panic key 12b7 that is used to return the setting of the screen that has been set by an erroneous operation to the previous setting. The television apparatus 10 carries out predefined functions corresponding to operations performed to the operation keys of the remote controller 12.

The image display unit 11 includes a main board 13 that generates image signals for displaying images and audio signals for outputting sounds from television broadcast waves that are received by an antenna 14, the display device 15 that displays the images corresponding to the image signals generated by the main board, and a speaker 16 that outputs the sounds corresponding to the sound signals generated by the main board. The main board 13, the display device 15, and the speaker 16 are housed in an enclosure (not shown in FIG. 1).

The main board 13 includes a primary circuit that generates a stabilized power supply from a commercial power supplied through a power plug 13j1, and a secondary circuit that generates images and sounds from television broadcast waves. In this instance, the secondary circuit is supplied with the stabilized power supply through a transformer (not shown in FIG. 1) from the primary circuit. The primary circuit includes a power supply circuit 13j where the commercial power supplied through the power plug 13j1 is rectified, and the rectified voltage is stepped up and down with the use of switching behavior of a transistor circuit to generate the stabilized power supply. The stabilized power supply generated as above is supplied to the secondary circuit through the transformer (not shown in FIG. 1).

The secondary circuit includes a tuner unit 13a, the input terminal group 13b, a switching unit 13c, an image circuit 13d, audio circuit 13e, a remote controller I/F 13f, a microcomputer 13g, a recording unit 13h, and an OSD circuit 13i. The microcomputer 13g is equipped with a CPU and a RAM, and fetches program data stored in the recording unit 13h and expands it on the RAM that works as a working area. The CPU will carry out an arithmetic operation for control process to be described later. The secondary circuit carries out the functions of the image display unit 11 under the control of the microcomputer 13g. In particular, when infrared signals are radiated from the infrared ray transmitting unit 12a to the remote controller I/F 13f through the operation of the remote controller 12, the remote controller I/F 13f coverts the received infrared signals to operation signals for the microcomputer 13g and sends them to the microcomputer 13g. The microcomputer 13g carries out the functions of the image display unit 11 by controlling the components that constitutes the secondary circuit according to the received signals. In this instance, the microcomputer behaves on the basis of the program stored in the recoding unit 13h. In this embodiment of the present invention, the recording unit 13h can be constituted by EEPROMs, flash ROMs, RAMs that can work as working memories for a microcomputer or the like.

The tuner unit 13a selects a modulated carrier wave corresponding to a channel selected by the operation of one of the channel keys 12b2 of the remote controller 12 from the television broadcast waves received by the antenna 14, and generates image signals and audio signals from the selected modulated carrier wave. The generated image signals are sent to the image circuit 13d, and the generated audio signals are sent to the audio circuit 13e. In this embodiment of the present invention, the tuner unit 13a can be a PLL type tuner. In addition, the tuner unit 13a can be a device that is capable of receiving both the airwaves of analog TV broadcasts and the airwaves of digital TV broadcasts, or can be a device that is capable of receiving only the airwaves of digital TV broadcasts.

The television apparatus 10 connects to external apparatuses such as video equipment through the input terminal group 13b and obtains image/audio data recorded on DVDs and the like to the image display unit 11. The input terminal group 13b generally includes a plurality of input terminals. When the signal for switching to the desired input terminal of the input terminal group 13b is sent to the microcomputer 13g by the operation of the menu key 12b4 and the like, the microcomputer 13g instructs the switching unit to connect image and audio signals to the image circuit 13d and the audio circuit 13e respectively through the desired input terminal. In this embodiment of the present invention, it is assumed that the input terminal group 13b includes 3 input terminals, that is, 13b1, 13b2, and 13b3. In addition, in this embodiment of the present invention, the television apparatus 10 is configured so that when the switching unit 13c selects the desired input terminal based on the instruction from the microcomputer 13g, image signals and audio signals from the tuner unit 13a are not connected to the image circuit 13d and the audio circuit 13e respectively. Therefore, there are no input signals into the display device 15 and the speaker 16 until image signals and audio signals come out from the desired input terminals.

The image circuit 13d generates RGB signals corresponding to gradations of RGB to display images on a display panel 15b of the display device 15 according to the input image signals, divides the RGB signals corresponding to the aftermentioned pixel arrangement of the display panel 15b. Signal processing such as gamma correction and image quality adjustments that can be selected by a user optionally are made on the divided RGB signals, and the RGB signals are sent to the display device 15. As examples of the image quality adjustments, there are brightness control that adjusts the brightness of images and gain control that adjusts the gradation difference of image. In addition, the above-described image quality adjustments have pre-defined initial setting values and the microcomputer 13g can return the setting values for the image quality adjustments to the initial setting values according to the instruction of the remote controller 12.

The display device 15 includes a driving circuit 15a that outputs a driving voltage to drive the display panel 15b on the basis of the RGB signals output from the image circuit 13, and the display panel 15b that forms pixels that are colored by three primary colors RGB in a matrix shape. The driving circuit 15a converts RGB signals into analog signals, and applies the analog signals to pixels of the display panel to display color images on screen. In this embodiment of the present invention, the display panel 15b can be a liquid crystal panel, a plasma display panel, or a cathode-ray tube.

The television apparatus 10 is capable of creating the menu screen using OSD images on the display device 15 through the operation of a menu key 12b4 of the remote controller 12. Receiving the instruction corresponding to the operation of a menu key 12b4 of the remote controller 12, the microcomputer 13g instructs an OSD circuit 13i to send image data for constituting the corresponding menu screen to the image circuit 13d. Receiving the instruction from the microcomputer 13g, the OSD circuit 13i sends OSD images to the image circuit 13d, and at the same time superimposes the OSD image onto image signals that are output from the tuner unit 13a or from the input terminal group 13b.

In the configuration of the television apparatus 10, when a user displays screen images other than ordinal screen images owing to an erroneous operation of the remote controller, he can return the screen images to ordinal screen images by pushing the panic key 12b7 of the remote controller 12.

There may be the following five situations where users make the wrong judgment that the television apparatus 10 has broken down when they erroneously operate the remote controller 12:

The first situation is the one where the input to the television apparatus 10 is switched to an external input without images by an erroneous operation while images from a television broadcasts or an external apparatus have been displayed.

The situation 2 is the one where a channel without broadcast signals is fortuitously selected while a channel with broadcast signals has been selected so far.

The situation 3 is the one where a menu screen is fortuitously displayed while images have been displayed on screen so far.

The situation 4 is the one where images displayed on screen drastically change owing to some kind of operation of an image quality adjustment.

The situation 5 is the one where a sound volume is zero owing to some kind of operation.

The television apparatus 10 is configured to be able to perform the return movement with the five situations in mind. Although the situations where users make the wrong judgment owing to erroneous operations are not limited to the five situations, it will be possible to cope with other various situations by changing after-mentioned flows.

Because the television 10 has two return setting methods to perform the return movement from the situations set by erroneous operations of the panic key 12b7 of the remote controller 12, one of the methods can be selected. The return setting method 1 is the one where the microcomputer 13g has the predicted situations caused by erroneous operations beforehand, judges which one of the predicted situations the current situation is when the panic key is pushed, and performs the return movement according to the situation. The return setting method 2 is the one where a user can select the state to which the television apparatus is returned from the situation caused by an erroneous operation when the panic key 12b7 is pushed. The two return setting methods are configured to be displayed on the menu screen so that they can be easily performed. The concrete configurations and functions of these return setting methods will be described below.

In the television apparatus 10, different return settings are adopted corresponding to the above-mentioned five situations so that the screen images of each situation can be returned to normal screen images by the operation of the panic key 12b7 of the remote controller 12. As mentioned above, the return setting method 1 is performed automatically by the microcomputer 13g that judges the current situation, and the return setting method 2 is performed through a user's operation and either one can be selected by the user. The concrete description will be ma de below.

The microcomputer 13g makes the recording unit 13h to record actually performed settings with their execution times as operating history items. The recorded operating history items are used for the return movements from the situations caused by erroneous operations. In this embodiment of the present invention, the above-mentioned operation history items are recorded to form an operation history table. In addition, operation items corresponding to external input operations, operation items corresponding to channel selection operations, operation items corresponding to menu screen selections and operations, operation items corresponding to image quality adjustment operations, and operation items corresponding to sound volume control operations are recorded in the operation history table to cope with the above-mentioned five situations. As mentioned above, the limitation to the operation items recorded in the operation history table makes it easy and swift for the microcomputer 13g to make the judgment. In this way, the microcomputer 13g and the recording unit 13h constitute an operation history recording unit.

The operation history table will be described below. FIG. 2 shows an example of the operation history table. There are three columns in the operation history table. The leftmost column is "Operation Time" column showing the time at which an operation was performed. The middle column is "Operation Name" column showing the content of an operation. The rightmost column is "Operation Number" column showing the number of times when an operation has been performed. As examples of the operations recorded in "Operation Name" column, "Channel 1 Selection" is recorded when a user selects the Channel 1 using a remote controller and so on, "Menu Screen Display" is recorded when a user displays the menu screen by pushing the menu key, "Video 3 Selection" is recorded when a user selects the input terminal 13b3, and "Mute Key" is recorded when a user operates a mute key 12b8. In the television apparatus 10, referring to the operation history table, the microcomputer 13g performs the corresponding return movement under the control of the program for returning from erroneous operation when a user pushes the panic key 12b7 at his erroneous operations. In this instance, the program for returning from erroneous operation is stored in the recording unit 13h. The concrete flows of the program for returning from erroneous operation will be described below. In this way, the microcomputer 13g and the recording unit 13h constitute the operation history recording unit.

B. The Return Setting Method 1

FIG. 3 shows an example of the operational flowchart of the microcomputer 13g in the return setting method 1. When the image display unit 11 is powered on by the power key 12b1 of the remote controller 12, the microcomputer 13g returns to the active mode from the waiting mode. When the microcomputer 13g in the active mode receives a channel operation signal through one of the channel keys 12b2 of the remote controller 12 or a instruction signal to display a menu screen through the menu key 12b4 of the remote controller 12 (Step 100), the microcomputer 13g records the above operation signals on the operation history table (Step 110). Next, the microcomputer 13g issues the instructions corresponding to the received operation signals to components that constitutes the television apparatus 10 (Step 120).

When the panic key 12b7 of the remote controller 12 is pushed, the panic signal is sent to the microcomputer 13g (Step 130). Then the microcomputer 13g judges in which one of the five situations the user is while referring the operation history items of the operation history table (Step 140). When judging in which situation the user is, the microcomputer 13g examines whether the situation is caused by "the operation of an external input", "the operation of a channel", "the operation of a menu screen", "the operation of an image quality adjustment", or "the operation of a mute key".

The microcomputer 13g refers to the newest operation history item of the operation history, and if the newest operation history item is the operation of an external input (Step 150), the microcomputer 13g judges whether the second newest operation history item is the operation of an external input or not (Step 160). If the second newest operation history item is the operation of an external input, the microcomputer 13g instructs the switching unit 13c to switch the current display screen image to the display screen image corresponding to the "operation name" of the second newest operation history item (for example, the external input 2).

If the second newest operation history item is not the operation of an external input, the microcomputer 13g judges whether the second newest operation history item is the operation of a channel or not (Step 180). If the second newest operation history item is the operation of a channel, the microcomputer 13g instructs the tuner unit 13a to select again the channel corresponding to the "operation name" of the second newest operation history item (for example, channel 1 selection) (Step 190). If the second newest operation history item is neither the operation of an external input nor the operation of a channel at Step 180, the microcomputer 13g searches the third newest operation history item or older retrospectively for the operation of an external input or the operation of a channel until either the operation of an external input or the operation of a channel is detected. If either the operation of an external input or the operation of a channel is detected, the microcomputer 13g issues the return instruction by instructing the corresponding component to perform the first detected operation (Step 200).

If the newest operation history item stored in the operation history table is not the operation of an external input, the microcomputer 13g judges whether the newest operation history item is the operation of a channel or not (Step 210). If the newest operation history item is the operation of a channel at Step 210, the microcomputer 13g searches the second newest operation history item or older retrospectively for the operation of a channel (Step 220). If the operation of a channel is detected, the microcomputer 13g instructs the tuner unit 13a to select the channel corresponding to the first detected operation of a channel (for example, channel 3 selection) (Step 230). [0050] If the newest operation history item in the operation history table is not the operation of a channel at Step 210, the microcomputer 13g judges whether the newest operation history item is the operation of a menu screen or not (Step 240). If the newest operation history item is the operation of a menu screen at Step 240, the microcomputer 13g searches the second newest operation history item or older retrospectively for the operation of a channel or the operation of an external input (Step 250). If either the operation of an external input or the operation of a channel is detected, the microcomputer 13g issues the return instruction corresponding to the first detected operation (Step 260).

If the newest operation history item in the operation history table is not the operation of a menu screen at Step 240, the microcomputer 13g judges whether the newest operation history item is the operation of an image quality adjustment or not (Step 270). If the newest operation history item is the operation of an image quality adjustment, the microcomputer 13g instructs the image circuit 13d to return the setting values for the image quality adjustments to the initial setting values (Step 280). If the newest operation history item in the operation history table is not the operation of an image quality adjustment at Step 270, the microcomputer 13g judges whether the newest operation history item is the operation of a mute key or not (Step 290). If the newest operation history item is the operation of a mute key, the microcomputer 13g instructs the audio circuit 13e to return the setting for the sound volume to the initial setting (Step 300). If the current situation is not any of the situations, the microcomputer copes with the current situation by returning all the settings for the television apparatus 10 to the initial settings.

As described above, the television apparatus 10, being activated by the operation of the panic key 12b7, copes with the following five situations. The behaviors of the television apparatus 10 can be summarized as below:

The situation 1 is the one where the input to the television apparatus 10 is switched to an external input without images. In this instance, the input is switched to the input from the last channel, or to another external input.

The situation 2 is the one where a channel without broadcast signals is selected. In this instance, the input is switched to the input from the last channel, or to another external input.

The situation 3 is the one where a menu screen is displayed and the menu screen occupies most of the screen. In this instance, the menu screen is erased.

The situation 4 is the one where images displayed on screen drastically change owing to some kind of operation of an image quality adjustment. In this instance, the setting values for the image quality adjustments are returned to the initial setting values.

The situation 5 is the one where a sound volume is zero owing to some kind of operation. In this instance, the setting for the sound volume is returned to the default setting.

In this way, the television apparatus 10 is configured to be able to perform the return movement with the five situations in mind.

C. The Return Setting Method 2

The above described first return setting method is very helpful to users who are not familiar with the setting functions of the television apparatus 10 because all the return movements from erroneous operations are performed automatically by the microcomputer 13g. Next, the return setting method 2 will be described below. In the return setting method 2, after pushing the panic key 12b7, a user can optionally select the return movement of the television apparatus 10. Therefore the user can make the television apparatus 10 to perform return movements corresponding to his individual erroneous operations. This is what distinguishes the return setting method 2 from the return setting method 1.

FIG. 4 is the operational flowchart of the microcomputer 13g in the return setting method 2 in this embodiment of the present invention. In FIG. 4, when 13g receiving the operation signal from the panic key 12b7 of the remote controller 12 (Step 430), the microcomputer 13g instructs the image circuit 13d to display the operation history table stored in the recording unit 13h on screen (Step 440). FIG. 5 shows an example of the operation history table displayed on screen. In this embodiment of the present invention, although the example of the operation history table shown in FIG. 5 is similar to that shown in FIG. 2, this limitation can be lifted as long as each item of the operation history table of this embodiment can be selected. In FIG. 5, an icon 17 that is moved up and down by a pair of the up-down keys 12b5 of the remote controller 12 is displayed in the column of "Operation Name", and the operation history item pointed to by the icon 17 is selected by the user's pushing the decision key 12b6.

When one of the operation history items of the operation history table is selected by the icon 17 with the use of a pair of the up-down keys 12b5 and the decision key 12b6 (Step 450), the microcomputer 13g issues the instructions corresponding to the selected operation history item of the operation history table (Step 460). The series of flows are repeated until the panic key 12b7 is pushed, and when the panic key 12b7 is pushed (Step 470), the microcomputer 13g stops displaying the operation history table on screen (Step 480) to return to its normal operation.

The return movement from erroneous operations through the return setting method 2 allows a user to select the operation history item to which he wants to return the television apparatus 10. In particular, when the user wants to return the setting for the image quality to the last setting or the second last setting instead of the initial setting, the return setting method 2 is very helpful. In the return setting method 2, because a user can perform the return movement from an erroneous operation while confirming the operation history items, the user can know what was wrong with his operation, which helps improve his operation skill.

D. A Variation Example 1 of the Present Invention

As a variation example 1 of the present invention, the television apparatus can be configured as follows:

(1) Every time the panic key 12b7 is pushed, the microcomputer 13g selects the operation history items of the operation history table one by one from the second last operation history item retrospectively.

(2) The microcomputer 13g performs the return movements corresponding to the selected operation history items one by one.

In this way, every time a user presses the panic key 12b7, he can confirm the states to which the television apparatus returns one by one retrospectively so that the user can returns the television apparatus 10 to the desired state. In addition, because the user can cancel the erroneous operations one by one retrospectively, the desired setting of the television apparatus can be quickly achieved.

E. A Variation Example 2 of the Present Invention

As a variation example 2 of the present invention, when the operation history item is selected by a user in the return setting method 2, the supplementary explanation screen corresponding to the number of times when the operation history item is selected can be displayed on screen to help improve his operation skill. In this embodiment of the present invention, when a user selects the return operation at Step 450 in FIG. 4, the ordinal return method with the use of the remote controller 12 is displayed on the explanation screen. The function of the variation example 2 helps the user to perform the return operation without using the panic key 12b7 when he makes the same erroneous operation again.

To implement the function, the television apparatus 10 is equipped with a selection table of explanation screens recorded in the recording unit 13h. The explanation screen selection table includes return methods corresponding to the operation history items of the operation history table. OSD images to display the explanation screens selected in the selection table of explanation screens are stored in the OSD circuit 13i. FIG. 6 shows an example of the selection table of the explanation screen. In FIG. 6, the top row is filled in with the operation contents recorded in the operation history table from left to right, and the leftmost column is also filled in with the similar operation contents from top to bottom. In the cell specified by a row and a column is the address where the operation explanation about how to return the state of the television apparatus 10 from the operation content of the top cell of the column to the operation content of the leftmost cell of the row is recorded.

FIG. 7 shows an example of the operational flowchart of the microcomputer 13g to display the explanation screen. At Step 450 in FIG. 4, when the desired operation history item of the operation history table displayed on screen is selected with the use of the icon 17, the microcomputer 13g refers to the number of selections of the selected operation history item of the operation history table (Step 600). If the number of selections is larger than the predefined threshold value, the microcomputer 13g refers to the newest operation history item and the second newest operation history item of the operation history table, and selects the addresses of the explanation screens corresponding to the two operation history items from the selection table of explanation screens. Next, the microcomputer 13g refers to the third newest operation history item and the fourth newest operation history item of the operation history table, and selects the addresses of the explanation screens corresponding to the two operation history items from the selection table of explanation screens. The similar procedures are repeated until the address of the explanation screens corresponding to the selected operation history item of the operation history table is selected (Step 610). The microcomputer 13g refers to the operation explanation corresponding to the selected operation history item of the operation history table in the OSD circuit 13i, and instructs the image circuit 13d to display the operation explanation (Step 620).

FIG. 8 shows an example of the operation history table with the explanation screen. FIG. 8 shows that when the second newest operation history item of the operation history table is selected with the use of the icon 17, if the number of selections corresponding to the item is larger than the threshold value N1, the explanation screen to return the state of the television apparatus 10 from the state where the input terminal group 13b is selected to the state where the channel 2 is selected is displayed in the form of word balloon. If the third newest or older operation history item with the number of selections more than N1 is selected with the use of the icon 17, the explanation screen to return the state of the television apparatus 10 from the state of the selected operation history item to the state of the item just after the state of the selected operation history item is displayed. In this way, the explanations to return the state of the television apparatus 10 from the current setting state to the state of the selected operation history item of the operation history table are displayed continuously on screen, which helps improve a user's operation skill because he can refer to these explanations. The selection method and the display methods of the explanation screens are not limited to the methods. The explanation screens can be selected and displayed through a character searching method with the selected operation history item of the operation history table used as a key word. This will leads to the simplification of the program and the execution time to display the explanation screens.

F. Conclusion

The television apparatus capable of returning from false settings that are set by erroneous operations to predefined settings through the easy operation of a remote controller is equipped with an operation history recording unit that records operation instructions to the television apparatus as the items of an operation history; and a unit for returning from erroneous operation, being started up by the panic key mounted on the remote controller, that performs a return movement from erroneous operations to return the setting of the television apparatus to the state corresponding to the item of the operation history that was recorded before the panic key operation by the operation history recording unit.

Incidentally, it should be understood that the present invention is not limited to the particular embodiment described herein. It will be recognized by those skilled in the art that the combination of the above-mentioned elements and constructions replaceable with each other may be suitably changed.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6. It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A television apparatus controlled by a operation instructions from a remote controller, comprising,
a display device that displays screens,
a speaker that outputs sounds,
a control unit that switches a channel displayed on the display device when the control unit receives 1st operation instructions from the remote controller, switches a mute function to change a volume output from the speaker when the control unit receives 2nd operation instructions from the remote controller, adjusts an image quality of a screen displayed on the display device when the control unit receives 3rd operation instructions from the remote controller, switches a menu screen displayed on the display device when the control unit receives 4th operation instructions from the remote controller or switches an external input inputted into the display device when the control unit receives 5th operation instructions from the remote controller,
a panic key mounted on the remote controller,
an operation history recording unit that records an operation name of the 1st to 5th operation instructions received by the control unit and an operation time that each of the 1st to 5th operation instructions is received as an item of an operation history when the control unit receives one of the 1st to 5th operation instructions,
a unit for returning erroneous operation that instructs the display device to display predetermined number of the items on the screen according to the order of the operation time from the newest item to the oldest item when a signal correspond to an operation of the panic key is received, receives selection instructions inputted by an operation of the remote controller for selecting one of the items displayed on the display, and makes the control unit perform an operation that corresponds to the item selected by the selection instructions.

2. The television apparatus as set forth in claim 1, wherein:
the operation history recording unit records a number of times which each item in the operation history are selected, and
the unit for returning erroneous operation instructs the display device to display the number of selection when the panic key is operated.

3. The television apparatus as set forth in claim 2, wherein:
a recording unit recording explanation data of the each item for generating instruction screens each showing operation steps to be performed with the operation to reverse a change of a setting of the television apparatus,
the unit for returning from erroneous operation instructs the display device to display the explanation data of the each item if the number of times is larger than a predetermined number.

4. The television apparatus as set forth in claim 3, wherein:
the unit for returning from erroneous operation selects the explanation data corresponding to the selected item by performing a character search using the name of the selected item as a key word.

* * * * *